United States Patent
Naitou et al.

(10) Patent No.: US 9,737,989 B2
(45) Date of Patent: Aug. 22, 2017

(54) HUMAN COOPERATION ROBOT SYSTEM IN WHICH ROBOT IS CAUSED TO PERFORM RETREAT OPERATION

(71) Applicant: FANUC Corporation, Yamanashi (JP)

(72) Inventors: Yasuhiro Naitou, Yamanashi (JP); Soichi Arita, Yamanashi (JP); Hiromitsu Takahashi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/047,631

(22) Filed: Feb. 19, 2016

(65) Prior Publication Data
US 2016/0243700 A1    Aug. 25, 2016

(30) Foreign Application Priority Data
Feb. 20, 2015    (JP) .................. 2015-032168

(51) Int. Cl.
*B25J 9/16*    (2006.01)
*G01L 5/00*    (2006.01)

(52) U.S. Cl.
CPC ........... *B25J 9/1633* (2013.01); *B25J 9/1674* (2013.01); *G01L 5/0076* (2013.01); *G05B 2219/40201* (2013.01); *G05B 2219/40202* (2013.01)

(58) Field of Classification Search
CPC ..... B25J 9/1633; B25J 9/1674; G01L 5/0076; G05B 2219/40201; G05B 2219/40202
See application file for complete search history.

(56) References Cited

U.S. PATENT DOCUMENTS

| | | | |
|---|---|---|---|
| 2010/0152896 A1 | 6/2010 | Komatsu et al. | |
| 2015/0081098 A1* | 3/2015 | Kogan | B25J 9/1656 700/258 |
| 2015/0290798 A1* | 10/2015 | Iwatake | B25J 13/085 700/257 |
| 2015/0367510 A1* | 12/2015 | Naitou | B25J 9/1633 700/253 |
| 2016/0214261 A1* | 7/2016 | Davis | B25J 19/06 |
| 2016/0229050 A1* | 8/2016 | Wang | B25J 13/025 |

FOREIGN PATENT DOCUMENTS

| | | |
|---|---|---|
| CN | 102387900 A | 3/2012 |
| CN | 103213143 A | 7/2013 |
| CN | 103528604 A | 1/2014 |
| CN | 103921266 A | 7/2014 |
| CN | 104224498 B | 4/2016 |
| JP | 6-245561 A | 9/1994 |

(Continued)

*Primary Examiner* — Khoi Tran
*Assistant Examiner* — Robert Nguyen
(74) *Attorney, Agent, or Firm* — Hauptman Ham, LLP

(57) ABSTRACT

A human cooperation robot system includes: an external force detecting unit that detects an external force acting on a robot; a retreat operation commanding unit that commands a retreat operation for causing the robot to be moved in a direction such that the external force is decreased when the external force detected by the external force detecting unit is larger than a first threshold value; a position acquiring unit that a current position of the robot; and a retreat operation stopping unit that stops the retreat operation when the current position of the robot acquired by the position acquiring unit departs from a retreat area.

3 Claims, 5 Drawing Sheets

(56) References Cited

FOREIGN PATENT DOCUMENTS

| | | | |
|---|---|---|---|
| JP | 6-292379 | A | 10/1994 |
| JP | 10-291182 | A | 11/1998 |
| JP | 11-10580 | A | 1/1999 |
| JP | 11-245191 | A | 9/1999 |
| JP | 11-277483 | A | 10/1999 |
| JP | 2000-284817 | A | 10/2000 |
| JP | 2009-178842 | A | 8/2009 |
| JP | 4445038 | B2 | 4/2010 |
| JP | 2011-93011 | A | 5/2011 |
| JP | 2014-18901 | A | 2/2014 |
| JP | 2014-188645 | A | 10/2014 |

* cited by examiner

WORKPIECE WEIGHT SETTING: 30kg
EXTERNAL FORCE ESTIMATION VALUE: 0kg

WORKPIECE WEIGHT SETTING: 30kg
EXTERNAL FORCE ESTIMATION VALUE: 30kg

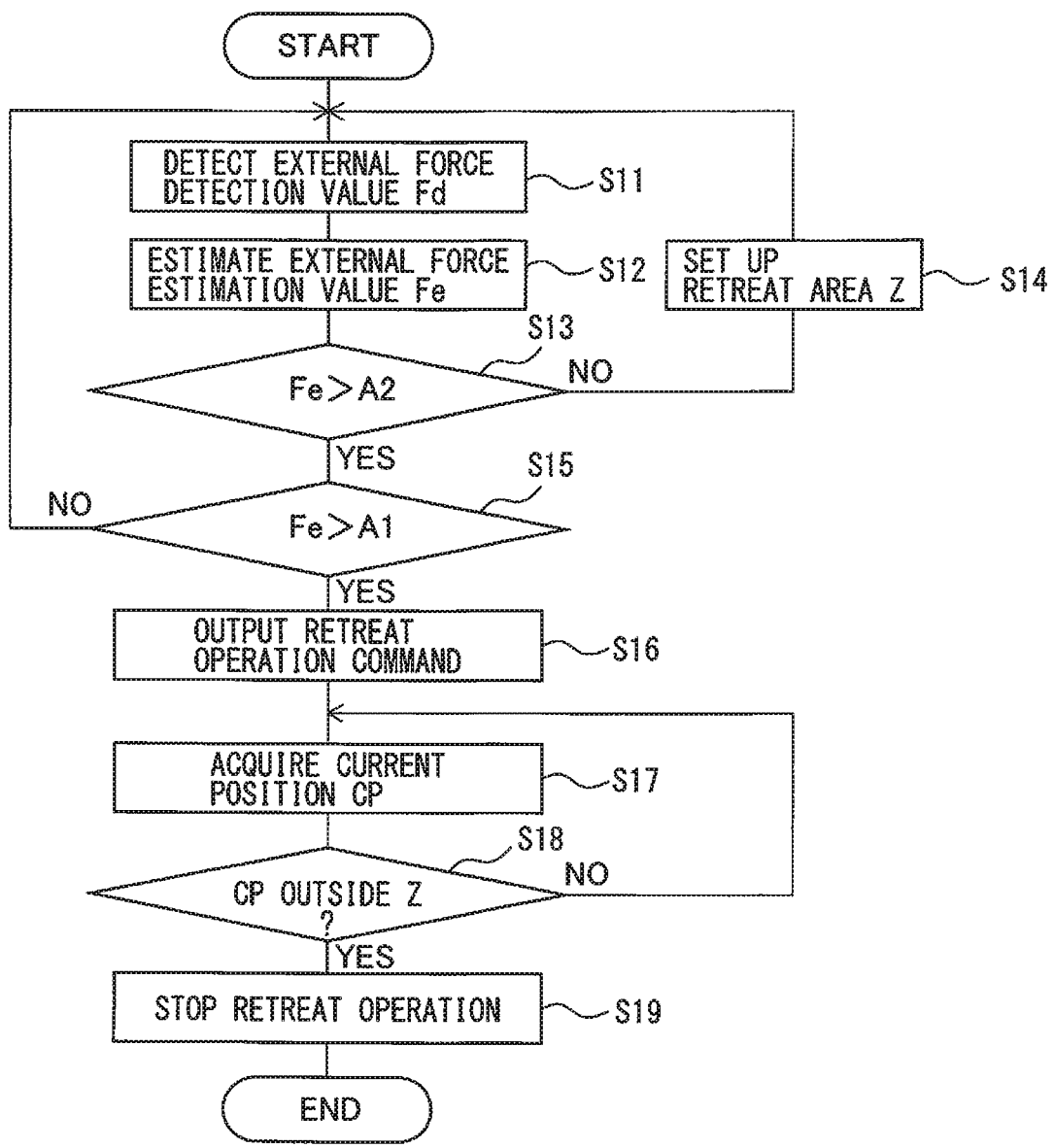

HUMAN COOPERATION ROBOT SYSTEM IN WHICH ROBOT IS CAUSED TO PERFORM RETREAT OPERATION

RELATED APPLICATIONS

The present application claims priority to Japanese Application Number 2015-032168, filed Feb. 20, 2015, the disclosure of which is hereby incorporated by reference herein in its entirety.

BACKGROUND OF THE INVENTION

1. Field of the Invention

The present invention relates to a human cooperation robot system in which a robot is caused to perform a retreat operation depending on an external force acting on the robot.

2. Description of the Related Art

In recent years, a human cooperation robot system has been developed in which a human and a robot are deployed in a mixed manner in a production site and a production operation is divided up between the human and the robot. In some cases, a safety fence is provided between a human and a robot in order to secure the human's safety. However, providing a safety fence could lead to a delay in the operation; therefore, there has recently been proposed a human cooperation robot system in which no safety fence is used.

In such a human cooperation robot system, when the robot approaches or comes into contact with a human, the robot is decelerated or stopped in order to secure the human's safety. However, since the human and the robot share the operation area, a case may occur in which the decelerated or stopped robot constitutes an obstacle when the human carries out an operation.

Thus, it is desired that such a robot be retreated from the operation area. Therefore, the robot is provided with a sensor that detects an external force imparted to the robot when the human pushes the robot. In this manner, the robot is caused to perform a retreat operation simply by the human pushing the robot with an external force larger than or equal to a predetermined value. In this instance, there is no need to use a teaching operation panel.

In Japanese Patent No. 4,445,038 Publication, in a system in which a human and a robot convey a workpiece in cooperation with each other, there is provided a sensor that detects an external force acting between the workpiece and a hand of the robot. In Japanese Patent Laid-open Publication No. H10-291182, a configuration is disclosed in which a torque sensor is provided between a motor and an arm driven by the motor.

SUMMARY OF THE INVENTION

However, a case may occur in which even though no external force is acting on the robot, the sensor may falsely detect an external force, and therefore the robot is caused to perform a retreat operation. Such a case is a case where a workpiece is unexpectedly dropped while being gripped by the robot, a case where a set value of the weight of the workpiece is incorrect, or the like. In this manner, there is a possibility to prevent the occurrence of a dangerous situation due to collision of the robot with a peripheral device, the human or the like.

Japanese Patent No. 4,445,038 Publication limits to a configuration in which the hand of the robot grips one end of the workpiece and the human grips the other end of the workpiece. Further, Japanese Patent No. 4,445,038 Publication envisages to provide the sensor between the robot and the hand, and therefore cannot be applied to a case where a sensor is provided on a joint of the robot as in Japanese Patent Laid-open Publication No. H10-291182. Hence, it is difficult to apply the configuration of Japanese Patent No. 4,445,038 Publication to a human cooperation robot system in which a robot and a human perform a cooperative operation while sharing a workspace with each other.

The present invention has been made in view of such circumstances, and has as an object to provide a human cooperation robot system in which even when a robot starts a retreat operation based on false detection by a sensor, it is possible to stop the retreat operation of the robot.

In order to achieve the foregoing object, according to a first aspect of the present invention, there is provided a human cooperation robot system in which a robot and a human perform a cooperative operation while sharing a workspace with each other, the system including: an external force detecting unit that detects an external force acting on the robot; a retreat operation commanding unit that commands a retreat operation for causing the robot to be moved in a direction such that the external force is decreased when the external force detected by the external force detecting unit is larger than a first threshold value; a position acquiring unit that acquires a current position of the robot; and a retreat operation stopping unit that stops the retreat operation when the current position of the robot acquired by the position acquiring unit departs from a retreat area.

According to a second aspect of the present invention, the system according to the first aspect of the present invention further includes a retreat area setting unit that sets up, as the retreat area, a predetermined area including the current position of the robot when the external force is smaller than or equal to a second threshold value smaller than the first threshold value.

According to a third aspect of the present invention, in the system according to the first or second aspect of the present invention, the external force detecting unit is a force sensor mounted at a distal end of the robot.

Based on a detailed description of exemplary embodiments of the present invention illustrated in the accompanying drawings, these and other objects, features and advantages will become more apparent.

BRIEF DESCRIPTION OF THE DRAWINGS

FIG. 5 is a flow chart illustrating the operation of the human cooperation robot system according to the present invention.

DETAILED DESCRIPTION

Figure 1:
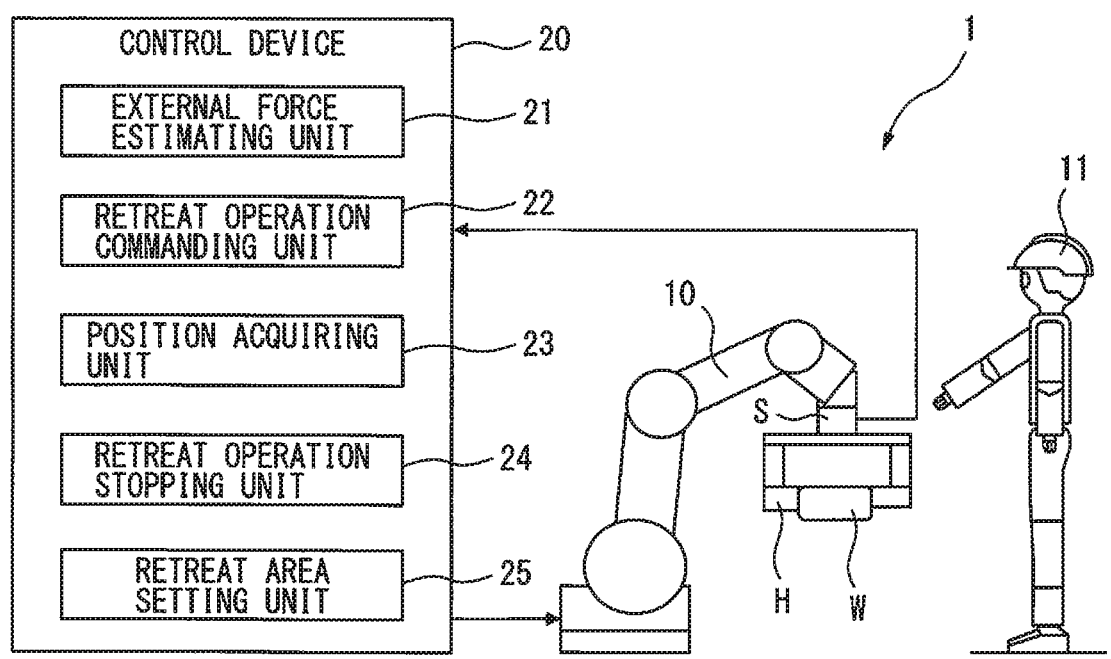
FIG. 1 is a view illustrating a basic configuration of the human cooperation robot system according to the present invention.

Embodiments of the present invention will be described with reference to the accompanying drawings hereinbelow. In the drawings, similar members are denoted by identical reference numerals or symbols. In order to facilitate understanding, the scale of the drawings has been changed arbitrarily.

FIG. 1 is a view illustrating a basic configuration of the human cooperation robot system according to the present invention. As illustrated in FIG. 1, the human cooperation robot system 1 mainly includes a robot 10, a control device 20 that controls the robot 10, and a human 11. Since the robot 10 is disposed adjacent to the human 11, in the human cooperation robot system 1, the robot 10 and the human 11 can perform a cooperative operation while sharing a workspace with each other.

The robot 10 is a 6-axes articulated robot, for example, which is provided at its distal end with a hand H capable of gripping a workpiece W. Further, a force sensor S is built in the robot 10 between the hand H and a distal end of a robot arm. Thus, the force sensor S detects, as an external force detection value Fd, an external force that acts from the place where the force sensor S is mounted to the distal end of the hand H and the workpiece W.

The control device 20 illustrated in FIG. 1 is a digital computer and includes an external force estimating unit 21 that estimates, as an external force estimation value, a force that acts from an external environment such as peripheral device or the like to the robot 10, using the external force detection value Fd detected by the force sensor S. The external force estimating unit 21 calculates an external force estimation value Fe by subtracting, from the external force detection value Fd detected by the force sensor S, the weight of each of the hand H and the workpiece W when no external force is acting thereon. When the external force estimation value Fe is calculated more accurately, it may be configured to further subtract, from the external force detection value Fd, a force that is caused to act on the force sensor S due to an inertial force resulting from the movement of each of the robot 10 and the workpiece W. Meanwhile, the external force estimation value Fe may be estimated by any other method. The force sensor S and the external force estimating unit 21 perform the function of an external force detecting unit that detects an external force acting on the robot 10.

Further, the control device 20 includes a retreat operation commanding unit 22 that commands a retreat operation for causing the robot 10 to be moved in such a direction that the external force estimation value is decreased when the external force estimation value Fd estimated by the external force estimating unit 21 is greater than a threshold value. Thus, when the human 11 intentionally pushes the robot 10 with a force larger than the threshold value, the retreat operation commanding unit 22 commands a retreat operation so that the robot 10 starts the retreat operation. Meanwhile, let it be assumed that the threshold value is obtained by an experiment or the like and stored in a storage unit (not illustrated) of the control device 20.

Further, the control device 20 includes a position acquiring unit 23 that acquires a current position of the robot 10. The position acquiring unit 23 is connected to an encoder (not illustrated) mounted on a motor (not illustrated) that drives each shaft of the robot 10. Thus, the position acquiring unit 23 can acquire a position of an arm distal end, especially of the robot 10.

Further, the control device 20 includes a retreat operating stopping unit 24 that stops the retreat operation commanded by the retreat operation commanding unit 22 when the current position of the robot 10 acquired by the position acquiring unit 23 departs from the retreat area. Further, the control device 20 includes a retreat area setting unit 25 that sets up, as the retreat area, a predetermined area including the current position of the robot 10 when the external force estimation value is smaller than or equal to the threshold value.

Figure 2:
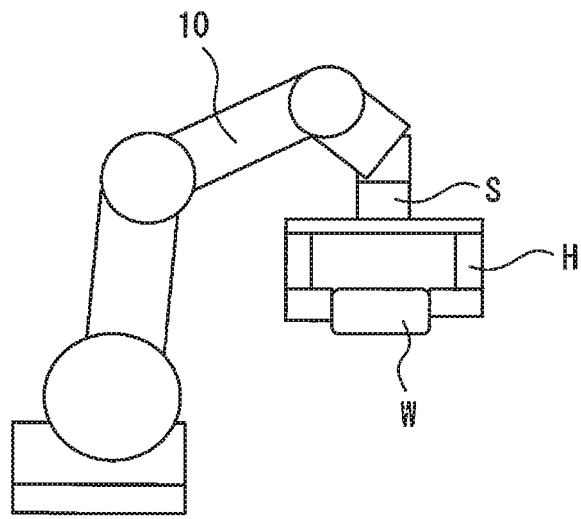
FIG. 2 is a first side view of a robot.
Figure 3:
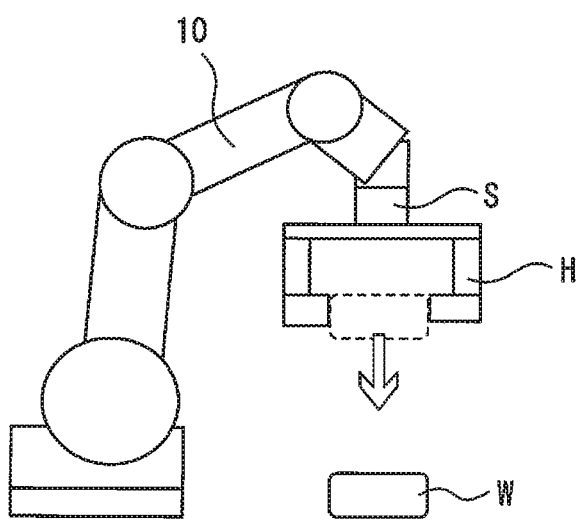
FIG. 3 is a second side view of the robot.

FIGS. 2 and 3 are side views of the robot. In FIG. 2, the hand H of the robot 10 grips a workpiece W having a weight of 30 kg, for example. In this instance, since there is no external force acting on the robot 10, the external force estimation value Fe calculated by the external force estimating unit 21 is 0 kg.

A case will now be considered in which the workpiece W is unexpectedly dropped from the hand H of the robot 10 as illustrated in FIG. 3. In this manner, the external force detection value Fd is decreased by 30 kg, which is the weight of the workpiece W. As a result, the external force estimation value Fe calculated by the external force estimating unit 21 becomes around 30 kg.

Thus, when the threshold value for the retreat operation commanding unit 22 is set to be around 30 kg, the retreat operation commanding unit 22 commands a retreat operation. In this instance, a situation occurs in which the robot 10 starts the retreat operation even though there is actually no need to retreat. In this manner, the robot 10 may collide with a peripheral device or the human 11, and therefore the robot 10 and/or the peripheral device may be damaged and/or the human 11 may be endangered.

Figure 4A:
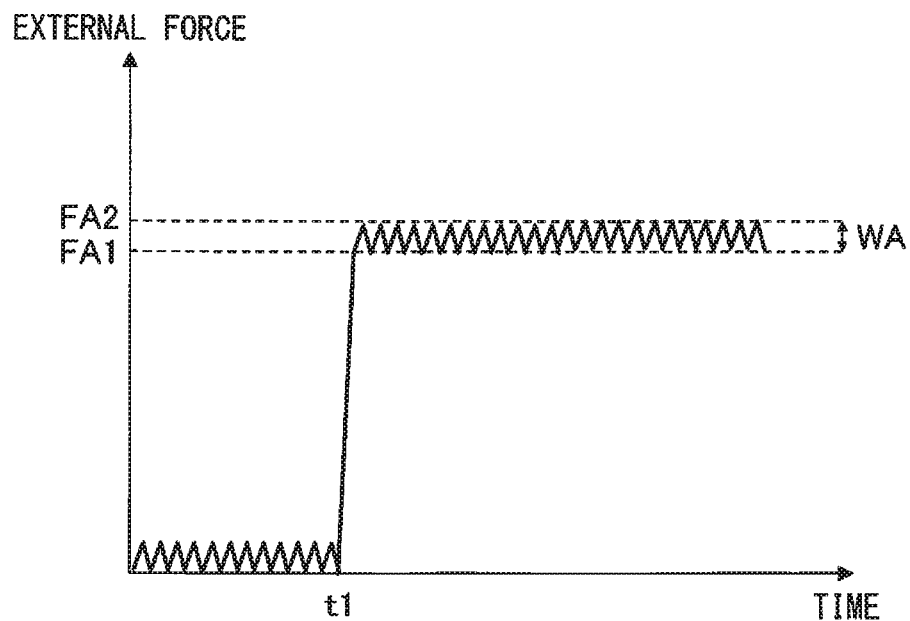
FIG. 4A is a view illustrating a relationship between time and external force.
Figure 4B:
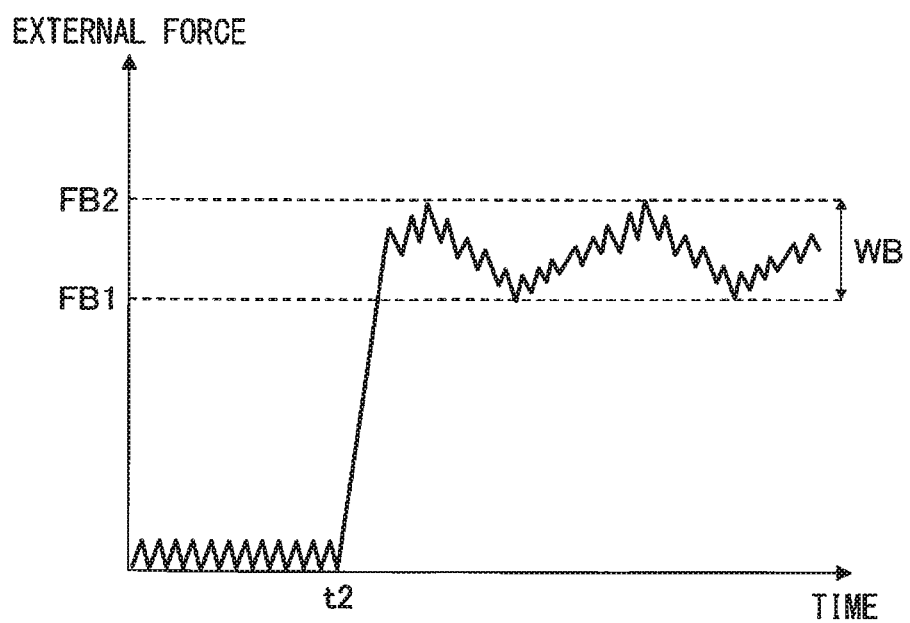
FIG. 4B is another view illustrating a relationship between time and external force.

FIGS. 4A and 4B are views each illustrating a relationship between time and external force. In these views, the horizontal axis represents time, and the vertical axis represents the external force detection value Fd estimated by the force sensor S. When the workpiece W is unexpectedly dropped from the hand H of the robot 10 at a time t1 in FIG. 4A, the external force is rapidly increased from substantially zero to an external force FA2. After that, the external force changes between the external force FA2 and a smaller external force FA1.

Similarly, when the human 11 intentionally pushes the robot 10 with a hand or the like at a time t2 in FIG. 4B, the external force is increased from substantially zero to an external force FB2. Then, the external force changes between the external force FB2 and a smaller external force FB1.

FIG. 5 is a flow chart illustrating the operation of the human cooperation robot system according to the present invention. Referring to FIG. 5, description will be made of the operation of the human cooperation robot system 1 hereinbelow. Meanwhile, let it be assumed that the process illustrated in FIG. 5 is repeatedly performed for each predetermined control cycle.

First, at step S11 of FIG. 5, the force sensor S detects the external force detection value Fd. Subsequently, at step S12, the external force estimating unit 21 estimates the external force estimation value Fe. Further, at step S13, the external force estimation value Fe is compared with a retreat area threshold value A2. The retreat area threshold value A2 is a predetermined value obtained by an experiment of the like, which is 2 kg, for example.

When it is determined at step S13 that the external force estimation value Fe is not larger than the retreat area threshold value A2, the process proceeds to step S14. At step S14, the retreat area setting unit 25 sets up a retreat area Z.

Figure 6A:
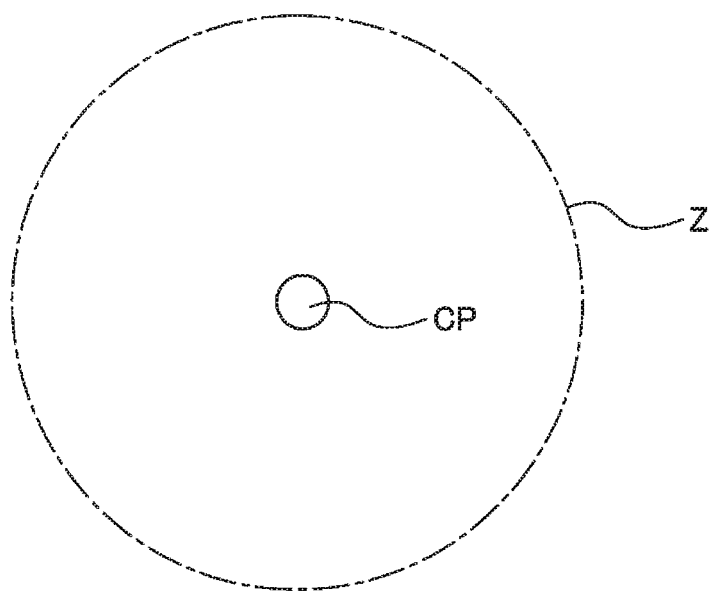
FIG. 6A is a view for explaining a retreat area.
Figure 6B:
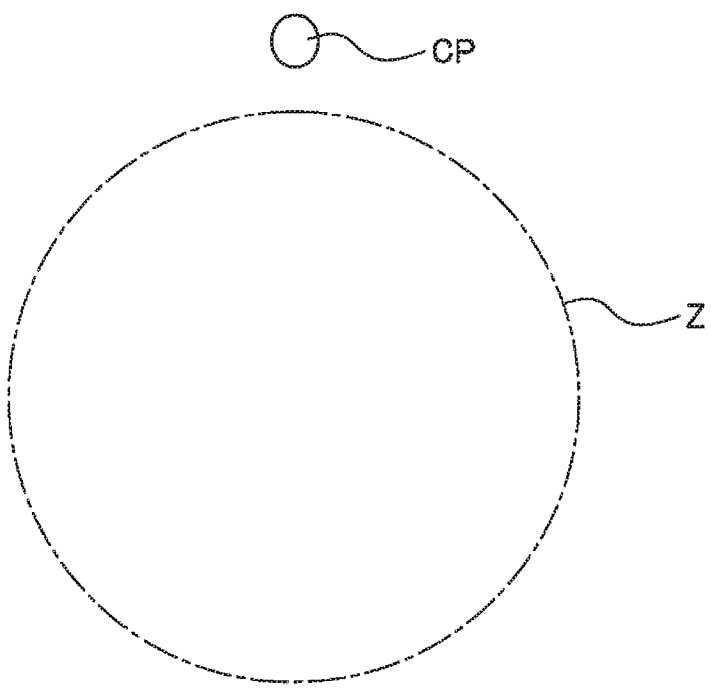
FIG. 6B is another view for explaining a retreat area.

FIGS. 6A and 6B are views for explaining the retreat area. First, a current position CP acquired by the position acquiring unit 23 is supplied to the retreat area setting unit 25. Then, as illustrated in FIG. 6A, a sphere having its center at the current position CP and having a predetermined radius is set as the retreat area Z. The predetermined radius may be 30 cm, for example. The retreat area Z may be set up by any other method. When the retreat area Z is set up, the process returns to step S11.

When it is determined at step S13 that the external force estimation value Fe is larger than the retreat area threshold value A2, the process proceeds to step S15. At step S15, it is further determined whether the external force estimation value Fe is larger than the threshold value A1. The threshold value A1 is a predetermined value that is larger than the retreat area threshold value A2 and is obtained by an experiment or the like, and the threshold value A1 is a predetermined value that is smaller than the external force FA1 illustrated in FIG. 4A and the external value FB1 illustrated in FIG. 4B and larger than zero, and is assumed to be around 30 kg, for example.

When it is determined that the external force estimation value Fe is larger than the threshold value A1, the process proceeds to step S16. At step S16, it is determined that the human 11 intentionally pushed the robot 10, and the retreat operation commanding unit 22 outputs a retreat command. This results in the robot 10 performing a retreat operation in such a direction as to decrease the external force estimation value. Meanwhile, when it is determined that the external force estimation value Fe is not larger than the threshold value A1, the process returns to step S11.

While the robot 10 is performing the retreat operation, at step S17, the position acquiring unit 23 acquires a current position CP of a distal end of the robot 10. Then, at step S18, it is determined whether the current position CP exists outside the retreat area Z. As illustrated in FIG. 6B, when the current position CP departs from the retreat area Z and exists outside the retreat area Z, at step S19, the retreat operation stopping unit 24 stops the retreat operation. Meanwhile, when the current position CP exists inside the retreat area Z, the process returns to step S17.

When the human 11 intentionally pushes the robot 10 with a force larger than the threshold value A1, the distal end of the robot 10 is moved by a predetermined radius, e.g., 30 cm, and then the robot 10 is stopped. In this instance, when the human 11 likewise pushes the robot 10 again, it follows that the robot 10 starts a retreat operation again.

Further, when the workpiece W is unexpectedly dropped from the hand H of the robot 10, the external force estimation value Fe becomes around 30 kg, so that the robot 10 starts a retreat operation. In this instance, the external force estimation value Fe remains substantially unchanged after the workpiece W is dropped. When the robot 10 departs from the retreat area Z, it follows that the robot 10 stops. Thus, when the robot 10 stops, it follows that no new retreat area Z is created. Therefore, in the present invention, even when, due to the workpiece W being unexpectedly dropped from the robot 10, a retreat operation is started, the robot 10 can be stopped.

As such, in the present invention, since the retreat area Z is set up beforehand, the area in which the robot 10 can perform a retreat operation can be limited. Hence, even when false detection is made such as when the workpiece W is unexpectedly dropped from the robot 10, the robot 10 is stopped when the robot 10 departs from the retreat area Z. Meanwhile, a predetermined area may be pre-set as the retreat area Z. In this manner, in the present invention, it is possible to prevent occurrence of a dangerous situation due to collision of the robot 10 with a peripheral device, the human 11 or the like. Similar control can be performed even when the robot 10 performs a retreat operation because of the set value of the weight of the work being incorrect.

Meanwhile, in the embodiment described with reference to FIG. 5, the external force estimating unit 21 estimates the external force estimation value Fe using the external force detection value Fd. However, the external force estimating unit 21 may estimate the external force estimation value Fe using a value of electric current flowing through a motor to drive each shaft of the robot 10. It is also possible to make a determination similar to that described above based on the external force detection value Fd of the force sensor S. In this instance, it is preferable that the first threshold value A1 and the second threshold value A2 be set separately.

Further, the force sensor S may be arranged on a base part of the robot 10. In this instance, it is possible to prevent the robot 10 from performing a retreat operation based on a false detection made due to another object being placed on an arm of the robot 10.

Advantageous Effect of the Invention

In the first aspect of the invention, even when the workpiece is unexpectedly dropped from the hand of the robot, the robot can be stopped when the current position of the robot departs from the retreat area. Thus, it is possible to prevent a dangerous situation from occurring due to collision of the robot with a peripheral device, a human or the like.

In the second aspect of the invention, by setting up the retreat area, it is possible to limit the area in which the robot can perform a retreat operation.

While the present invention has been described with respect to exemplary embodiments thereof, it will be appreciated by those skilled in the art that the above-described changes and a variety of other changes, omissions and additions can be made without departing from the scope of the present invention.

What is claimed is:

1. A human cooperation robot system in which a robot and a human perform a cooperative operation while sharing a workspace with each other, comprising:
    an external force detecting unit that detects an external force acting on the robot;
    a retreat operation commanding unit that commands a retreat operation for causing the robot to be moved in a direction such that the external force is decreased when the external force detected by the external force detecting unit is larger than a first threshold value, when the human pushes the robot while the robot is in a stopped situation:
    a position acquiring unit that acquires a current position of the robot; and
    a retreat operation stopping unit that stops the retreat operation when the current position of the robot acquired by the position acquiring unit departs from a retreat area, in which the retreat operation is permitted.

2. The human cooperation robot system according to claim 1, further comprising a retreat area setting unit that sets up, as the retreat area, a predetermined area including the current position of the robot when the external force is smaller than or equal to a second threshold value smaller than the first threshold value.

3. The human cooperation robot system according to claim 1, wherein the external force detecting unit is a force sensor mounted on a distal end of the robot.

* * * * *